(12) United States Patent
Kristiansson et al.

(10) Patent No.: US 9,398,426 B2
(45) Date of Patent: Jul. 19, 2016

(54) METHOD AND APPARATUS FOR TRANSMITTING SECURE CELL BROADCAST MESSAGES IN A CELLULAR COMMUNICATION NETWORK

(75) Inventors: Ulf Kristiansson, Karlskrona (SE); Karl-Johan Östh, Karlskrona (SE); Elias Blomqvist, Lyckeby (SE); Geert Claassen, Nättraby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 126 days.

(21) Appl. No.: 13/983,820

(22) PCT Filed: Jun. 30, 2011

(86) PCT No.: PCT/SE2011/050892
§ 371 (c)(1),
(2), (4) Date: Aug. 6, 2013

(87) PCT Pub. No.: WO2012/108803
PCT Pub. Date: Aug. 16, 2012

(65) Prior Publication Data
US 2013/0308781 A1   Nov. 21, 2013

Related U.S. Application Data

(60) Provisional application No. 61/439,997, filed on Feb. 7, 2011.

(51) Int. Cl.
*H04L 29/00* (2006.01)
*H04W 4/06* (2009.01)
(Continued)

(52) U.S. Cl.
CPC .............. *H04W 4/06* (2013.01); *H04L 12/189* (2013.01); *H04L 63/104* (2013.01); *H04W 12/00* (2013.01); *H04W 12/02* (2013.01); *H04W 72/005* (2013.01); *H04W 76/002* (2013.01)

(58) Field of Classification Search
CPC ....... H04W 4/06; H04W 21/00; H04W 12/02; H04W 72/005; H04W 76/002; H04L 63/104; H04L 12/189
See application file for complete search history.

(56) References Cited

U.S. PATENT DOCUMENTS 6,782,475 B1 *  8/2004  Sumner ................... H04L 12/18
                                                  380/255
6,832,314 B1   12/2004  Irvin
(Continued)

FOREIGN PATENT DOCUMENTS

GB    2 327 567 A      1/1999
WO    WO 96/41493 A1  12/1996
WO    WO 01/72062 A1   9/2001

OTHER PUBLICATIONS

International Search Report, Application No. PCT/SE2011/050892, Jan. 4, 2012.
(Continued)

*Primary Examiner* — Michael Pyzocha
(74) *Attorney, Agent, or Firm* — Patent Portfolio Builders, PLLC

(57) ABSTRACT

A method and apparatus is provided for transmitting a cell broadcast message in a mobile communication network comprising in a message control node receiving a initiation request identifying a first message payload segment to be transmitted, determining an authentication group for which the first message payload segment is intended and determining a first encryption key associated with the determined authentication group. The first message payload segment is encrypted using the first encryption key. A message payload is aggregated comprising the encrypted first message payload segment and at least a second message payload segment. The cell broadcast message comprising the aggregated message payload for message broadcast is transmitted within at least a part of the communication network. A method and apparatus is also provided for decrypting a cell broadcast message at a mobile terminal.

12 Claims, 7 Drawing Sheets

(51) Int. Cl.
  *H04L 29/06* (2006.01)
  *H04W 12/02* (2009.01)
  *H04W 72/00* (2009.01)
  *H04L 12/18* (2006.01)
  *H04W 12/00* (2009.01)
  *H04W 76/00* (2009.01)

(56) References Cited

U.S. PATENT DOCUMENTS

| | | | | |
|---|---|---|---|---|
| 7,962,089 | B1* | 6/2011 | Thommana et al. | 455/3.01 |
| 2003/0105719 | A1* | 6/2003 | Berger et al. | 705/51 |
| 2004/0027999 | A1* | 2/2004 | Casaccia | H04L 1/08 370/312 |
| 2006/0056635 | A1* | 3/2006 | Pappas | H04W 84/08 380/270 |
| 2007/0028099 | A1* | 2/2007 | Entin et al. | 713/163 |
| 2007/0288386 | A1* | 12/2007 | Adachi | G06F 21/10 705/58 |
| 2009/0190757 | A1* | 7/2009 | Chen | H04N 7/1675 380/242 |
| 2011/0154382 | A1* | 6/2011 | Chow | H04N 21/25841 725/5 |
| 2012/0106738 | A1* | 5/2012 | Belenkiy | H04L 9/0872 380/270 |

OTHER PUBLICATIONS

Written Opinion of the International Searching Authority, Application No. PCT/SE2011/050892, Jan. 4, 2012.
Written Opinion of the International Preliminary Examining Authority, Application No. PCT/SE2011/050892, Feb. 14, 2013.
International Preliminary Report on Patentability, Application No. PCT/SE2011/050892, May 13, 2013.
3GPP, Technical Specification: 3$^{rd}$ Generation Partnership Project; Technical Specification Group Core Network and Terminals; Technical realization of Cell Broadcast Service (CBS) (Release 11), 3GPP TS 23.041 V11.0.0 (Dec. 2010), 48 pp.

* cited by examiner

METHOD AND APPARATUS FOR TRANSMITTING SECURE CELL BROADCAST MESSAGES IN A CELLULAR COMMUNICATION NETWORK

CROSS REFERENCE TO RELATED APPLICATIONS

This application is a 35 U.S.C. §371 national stage application of PCT International Application No. PCT/SE2011/050892, filed on 30 Jun. 2011, which itself claims the benefit of U.S. provisional Patent Application No. 61/439,997, filed 7 Feb. 2011, the disclosures and contents of both of which are incorporated by reference herein in their entirety.

FIELD OF INVENTION

The invention relates to transmitting a message in a communication network and more particularly to a method and apparatus for transmitting a cell broadcast message in a mobile communication network.

BACKGROUND

Subscribers of communication services are grouped into user segments based on for example subscription types but may also be grouped into user communities due to various preferences as social networks, hobbies, demographical profile etc.

With more and more personalized offerings and subscription in the mobile networks, it becomes increasingly important to tailor the information presented to the end users based in such groupings. For example, if the operator targets a specific segment of users in a certain locality to receive a free coffee at the local café, only the intended end users should see the message. If other end users see the message they might want to use the offer as well and the operator will either get complaints or higher cost for the campaign.

Various mechanisms exist to communicate information to a user in a communications network such as a mobile network, e.g. Global System for Mobile Communications GSM or Universal Mobile Telecommunications System UMTS. These include for example Unstructured Supplementary Service Data USSD, Short Message Service SMS or Internet email.

All these mechanisms are unicast transmission mechanisms, i.e. the sending of messages to a single network destination identified by a unique address.

Many applications requiring transmission of information to be mass-distributed are too costly to be conducted with unicast transmission since each network connection consumes computing resources on the sending host and requires its own separate network bandwidth for transmission.

Unicast mechanisms are therefore contrasted with broadcasting mechanisms which usually implies transmitting the same data to all possible destinations.

The 3rd Generation Partnership Project 3GPP has in TS 23.041 V11.0.0 standardized a Cell Broadcast Service CBS for GSM and UMTS.

The CBS service is analogous to the Teletex service offered on television, in that like Teletex, it permits a number of unacknowledged general CBS messages to be broadcast to all receivers within a particular region. CBS messages are broadcast to defined geographical areas known as cell broadcast areas. These areas may comprise of one or more cells, or may comprise the entire mobile network. CBS messages are broadcast cyclically by the cell at a frequency and for a duration agreed with the information provider.

GB-2 327 567 A provides a method wherein mobile stations' access to a limited access message transmitted using a cell broadcast service may be prevented by encrypting the message before transmission thereby providing message access only for authorized mobile stations.

A problem with GB-2 327 567 A is that it consumes a high level of the available amount of broad casting transmission resource as restricted by the available number of logical broadcast channels identified by Message Identifiers MI. For example, TS 23.041 V11.0.0 limits the number of MIs to two octets setting a limit of 65536 different codes. In practice this amount is further restricted by the 3GPP standard in that only the 1000 lowest MI codes may be entered by the user while the higher numbered codes require enablement by the network operator as set out in TS 23.041 V 11.0.0 Chapter 8.

In a large network where users are segmented into numerous groups due to for example hobbies, preferences or memberships in social networks—each requiring tailored notifications over cell broadcast—these limits are problematic for network operators.

SUMMARY OF INVENTION

An object of the invention is to provide a method and apparatus for transmitting a cell broadcast message in a mobile communication network mitigating the problem of consumption of available amount of broad casting transmission resource as restricted by the available number of logical broadcast channels.

The invention relates to a method for transmitting a cell broadcast message in a mobile communication network comprising in a message control node receiving a initiation request identifying a first message payload segment to be transmitted, determining an authentication group for which the first message payload segment is intended and determining a first encryption key associated with the determined authentication group. The first message payload segment is encrypted using the first encryption key. A message payload is aggregated comprising the encrypted first message payload segment and at least a second message payload segment. The cell broadcast message comprising the aggregated message payload for message broadcast is transmitted within at least a part of the communication network.

It is an advantage of the invention that encryption on payload segment level provides efficient use of logical broadcast channels since these are a limited resource It is another advantage that several broadcast messages can be sent within the same logical broadcast channel without having to await the next available transmission slot thereby reducing latency.

A further advantage is that because plural message payload segments are aggregated into a broadcast message shorter cycles until retransmission may be gained thereby increasing the chance of high speed moving mobiles being able to get the message.

It is yet a further advantage that messages can be personalized for the end user or end user group in that parts of a message can be individually revealed.

Another aspect of the invention relates to a message control node for transmitting a cell broadcast message in a mobile communication network. The message control node is comprising receiver unit for receiving a initiation request identifying a first message payload segment to be transmitted, a determination unit for determining an authentication group for which the first message payload segment is intended and for determining a first encryption key associated with the determined authentication group, an encryption unit for encrypting the first message payload segment using the first encryption key, an aggregation unit for aggregating a message payload comprising the encrypted first message payload segment and at least a second message payload segment and a transmission unit for transmitting the cell broadcast message comprising the aggregated message payload for message broadcast within at least a part of the communication network.

An further object of the invention is to provide a method and apparatus for receiving a cell broadcast message in a mobile communication network mitigating the problem of consumption of available amount of broad casting transmission resource as restricted by the available number of logical channels.

The invention relates to a method for presenting a cell broadcast message at a mobile terminal comprising the steps of receiving an decryption key and receiving a cell broadcast message comprising an aggregated message payload comprising an encrypted first message payload segment and at least a second message payload segment. The encrypted first message payload segment is identifying and decrypted using the received decryption key. The decrypted first message payload segment is presented at the mobile terminal.

In yet another aspect of the invention relates to a mobile terminal adapted for presenting a cell broadcast message. The mobile terminal is comprising a receiver unit for receiving an decryption key and for receiving a cell broadcast message comprising an aggregated message payload comprising an encrypted first message payload segment and at least a second message payload segment, an extraction unit for identifying the encrypted first message payload segment, a decryption unit for decrypting the first message payload segment using the received decryption key and a presentation unit for presenting the decrypted first message payload segment at the mobile terminal.

Embodiments of the invention will now be described in more detail with reference to the enclosed drawings.

DETAILED DESCRIPTION OF THE INVENTION

Figure 1:
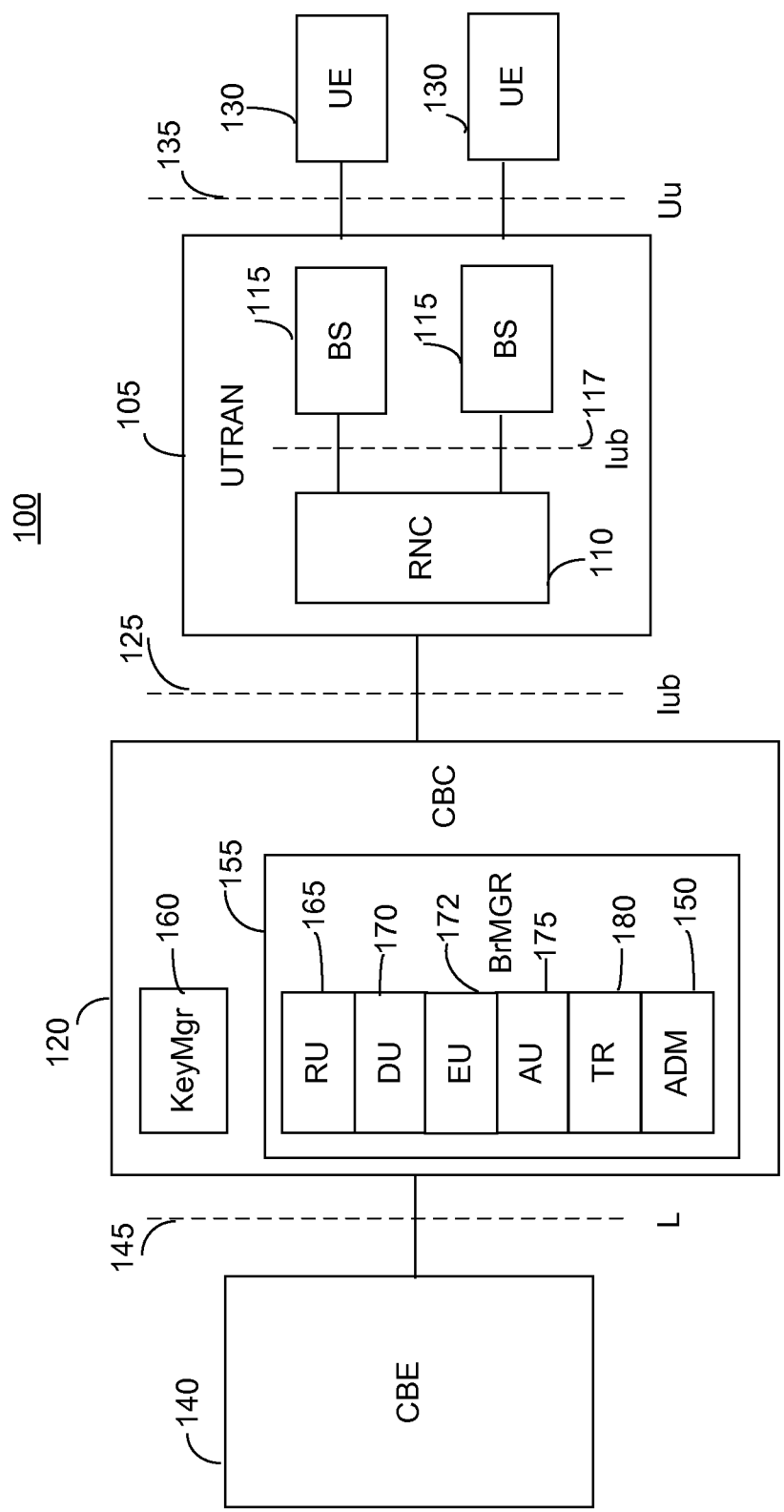
FIG. 1 is a block diagram showing the basic network structure of a cell broadcast service according to an embodiment of the invention.

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Subscribers can today subscribe to information broadcasted in the radio network. The information is then presented to the end user at a mobile terminal. The same information is broadcasted in one or several cells and is called cell broadcast.

Cell Broadcast CB messaging is a mobile technology feature and is part of the GSM standard. It is also known as Short Message Service—Cell Broadcast SMS-CB. The 3rd Generation Partnership Project 3GPP has in TS 23.041 V11.0.0 standardized a Cell Broadcast Service CBS for GSM and UMTS, and under standardization for Long Term Evolution LTE.

A CBS page comprises of 82 octets, which, using the default character set, equates to 93 characters. Other Data Coding Schemes may also be used, as described in 3GPP TS 23.038. Up to 15 of these pages may be concatenated to form a CBS message. Each page of such CBS message will have the same Message Identifier MI (indicating the source of the message), and the same serial number. Using this information, the Mobile Station MS/User Equipment UE is able to identify and ignore re broadcasts of already received messages.

CBS messages are broadcast cyclically by the cell at a frequency and for a duration agreed with the information provider. The frequency at which CBS messages are repeatedly transmitted will be dependent on the information that they contain; for example, it is likely that dynamic information such as road traffic information, will require more frequent transmission than weather information. The repetition period will also be affected by the desire for CBS messages to be received by high speed mobiles which rapidly traverse cells. Reception of CBS messages for a MS/UE is not a requirement if it is connected in the Circuit Switched CS domain. It should be possible for a UE to receive messages if it is connected in the Packet Switched PS domain and no data is currently transmitted.

Information can be broadcasted on several logical channels and the end user can choose which channels to listen to, and thereby what information to see.

Thus, to permit mobiles to selectively display only those CBS messages required by the MS/UE user, CBS messages are assigned a message class which categorizes the type of information that they contain and the language (Data Coding Scheme) in which the CBS message has been compiled. Through the use of appropriate Man Machine Interface MMI, the user is then able to ignore message types that he does not wish to receive, e.g. advertising information or messages in an unfamiliar language.

For example, logical channel 050 is used by some operators to send information about the location of the cell. The terminals then present the information to the end users which get information about there location, for example "Airport" or "SoHo, Manhattan".

The terminals can be configured by the end users what logical channels between 0 and 1000 to listen too. To configure a terminal to listen to logical channels above 1000 it is required to use a MMI e.g. provided as a "simApp" by the operator. SimApps are SIM Application Toolkit commonly referred to as STK applications. SIM Application Toolkit is a standard of the GSM system which enables the Subscriber Identity Module SIM to initiate actions. STK is also supported in 3G networks in the form of USIM Application Toolkit USAT as defined by 3GPP TS 31.111 Universal Subscriber Identity Module USIM Application Toolkit USAT.

Cell broadcast is a cheap transmission method in that it requires less resources from the system, such as bandwidth and processing power to distribute information to the end user compared to other system initiated methods like SMS, Multimedia Message Service MMS, and USSD etc.

FIG. 1 is a block diagram showing the basic network structure of a cell broadcast service 100 according to an embodiment of the invention.

CBS messages may originate from a number of Cell Broadcast Entities CBEs 140, which are connected to a Cell Broadcast Centre CBC 120 via an interface L 145. CBS messages are then sent over a Iu(BC) interface 125 from the CBC to a Radio Network Controller RNC 110 being a part of a Universal Terrestrial Radio Access Network UTRAN 105 for further transmission over the Iub interface 117 to the base stations such as Node Bs 115 serving the UEs 130 over the Uu interface 135, in accordance with the CBS's coverage requirements. The GSM CBS is similar to the UMTS CBS but the UTRAN is replaced with the GSM Base Station System BSS.

In GSM and UMTS the CBC is regarded to be integrated as a node into the core network and connected to a routing node e.g. a Supporting GPRS Node SGSN (not shown) via a BC reference point. Thus the CBC can reach every RNC via the user plane of the IuBC interface 125. The Cell Broadcasting Entity CBE 140 may be responsible for formatting CBS, including the splitting of a CBS message into a number of pages. The CBC may be connected to several Base Station Controllers BSCs (for GSM) or RNCs (for UMTS). The CBC may be connected to several CBEs. The CBC is responsible for the management of CBS messages including:

- allocation of serial numbers;
- modifying or deleting CBS messages held by the BSC/RNC;
- initiating broadcast by sending fixed length CBS messages to a BSC/RNC for each language provided by the cell, and where needed padding the pages to a length of e.g. 82 octets;
- determining the set of cells to which a CBS message should be broadcast, and
- indicating within the serial number the geographical scope of each CBS message;
- determining the time at which a CBS message should commence being broadcast;
- determining the time at which a CBS message should cease being broadcast and subsequently instructing each BSC/RNC to cease broadcast of the CBS message;
- determining the period at which broadcast of the CBS message should be repeated;
- determining the cell broadcast channel, on which the CBS message should be broadcast;
- when CBS transmits emergency messages, allocation of "emergency indication" to differentiate it from normal CBS messages, including "Cell ID/Service Area ID list", "warning type", "warning message". If "warning type" is of 'test', only UEs which are specially designed for testing purposes may display warning message.

The CBC further includes a message control node such as a Broadcast Manager BrMGR 155 providing the L interface towards CBEs.

The BrMGR includes a message administration interface ADM 150 used to initiate the creation of authentication groups and encryption key at a key manager KeyMGR 160.

By defining authentication groups certain privacy arrangements such as specific encryption schemes can be associated with the authentication group. Only users associated with, or connected to, the authentication group will thus be given access to the information. The ADM further initiates the connection of a user to an authentication group. Before connection the BrMGR validates the existence of the authentication group.

The ADM also provides upon request from UEs 130, or applications, or on regular intervals, for checking which authentication groups that a user belongs to and retrieving adequate decryption keys from the KeyMGR 160 for transmission to the UE.

The BrMgr includes a Receiving Unit RU 165 for receiving a initiation request identifying a first message payload segment to be transmitted, a Determination Unit DU 170 for determining an authentication group for which the first message payload segment is intended and for determining a first encryption key associated with the determined authentication group, an Encryption Unit EU 172 for encrypting the first message payload segment using the first encryption key, an Aggregation Unit AU 175 for aggregating a message payload comprising the encrypted first message payload segment and at least a second message payload segment and a Transmission Unit TU 180 for transmitting the cell broadcast message comprising the aggregated message payload for message broadcast within at least a part of the communication network.

The DU may be further adapted to determine authentication group based on a user or user group for which the first message payload segment is intended.

The AU may be further adapted to aggregate the first and/or second message payload segment as a cell broadcast page or a cell broadcast block. Alternatively, the AU is adapted to aggregate the first and/or second message payload segment as a subsection of a cell broadcast block in which case the aggregated message payload may comprise a first indicator allowing an end of the first message payload segment to be identified and/or a second indicator allowing an end of the second message payload segment to be identified by a receiving mobile terminal.

The DU may be further adapted for determining a second authentication group for which the second message payload segment is intended and for determining a second encryption key associated with second authentication group in which case the EU is further adapted for encrypting the second message payload segment using the second encryption key; and the aggregation unit is further adapted in that the aggregating is aggregating the encrypted second message payload segment.

The AU may further adapt the cell broadcast message to comprise an indication on whether the first and/or second payload segment is encrypted or unencrypted.

The RU may be further adapted for receiving a request for decryption keys from a mobile terminal, the determination unit further adapted for determining an authentication group allowable for the mobile terminal and determining a decryption key for the determined authentication group and the TU further adapted for transmitting the determined decryption key for storage at the mobile terminal. The authentication group may be determined based on mobile terminal subscriber data.

The receiver unit may be further adapted for receiving a request for decryption keys from a mobile terminal, the determination unit adapted for determining an authentication group allowable for the mobile terminal and determining a decryption key for the determined authentication group and the transmission unit adapted for transmitting the determined decryption key for storage at the mobile terminal.

The determination unit may be further adapted for the authentication group to be determined based on mobile terminal subscriber data.

It should be noted that although a specific configuration of the BrMGR and KeyMGR has been presented in conjunction with FIG. 1 several configurations are possible. For example, the BrMGR and KeyMgr can be stand alone nodes or they can be co-located. One or both of the BrMGR and KeyMGR can also be located as part of the CBE or as part of the CBC.

Figure 2:
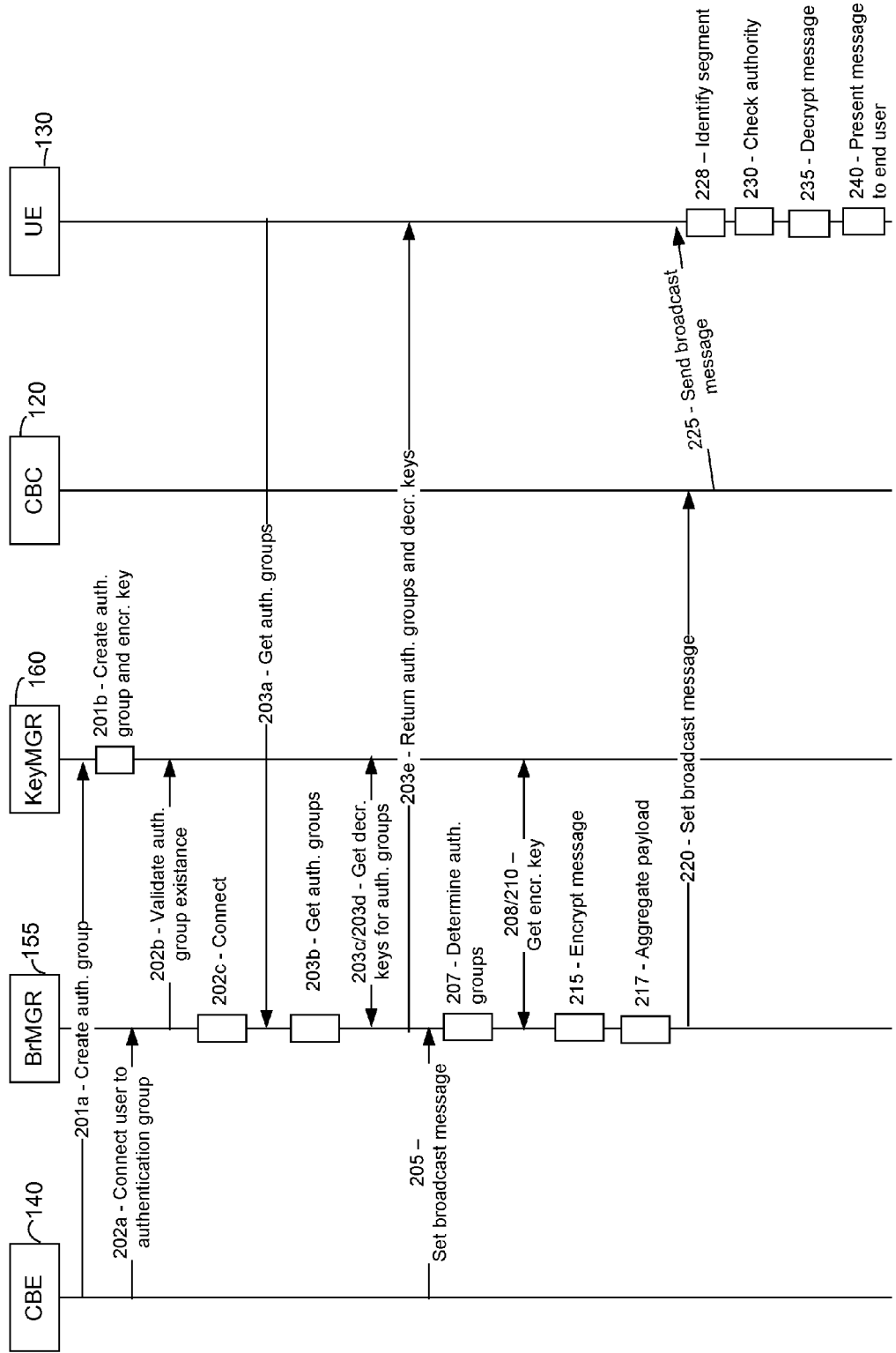
FIG. 2 is a message sequence chart showing a cell broadcast service according to an embodiment of the invention.

FIG. 2 is a message sequence chart showing a cell broadcast service according to an embodiment of the invention.

In step 201a a request for creating a new authentication group is received by the KeyMGR 160. This request may be initiated by for example an administrator running an administration console on the CBE 140. The KeyMGR proceeds in step 201b with creating the authentication group and an associated encryption key for the group.

In step 202a a request for connecting a user to an authentication group and to assign it to a user is received by the BrMGR 155. This request may be initiated by for example an administrator running an administration console on the CBE 140. The BrMGR proceeds in step 202b with validating that the authentication group exists by querying the KeyMGR and upon confirmation connects the user to the authentication group in step 202c.

The BrMGR can either push the encryption keys together with logical channel information to the UEs; or the UEs can pull the encryption key and logical channel information from the BrMGR.

In step 203a on request, or on a regular intervals, by the terminals or application the broadcast manager checks in step 203b which authentication groups that the user belongs to and retrieves the encryption keys from the encryption key manager in steps request step 203c and receipt step 203d. By validating the end user, before the encryption key management system return an encryption key to the terminal, it is possible to control who can decrypt the information. The checking which authentication groups that the user belongs to may utilize a rule engine taking into account data, user data or subscription data in order to determine for which authorization groups the user is eligible to retrieve encryption keys.

The CBS starts in step 205 and is initiated by an administrator setting a new broadcast message and specifies for what authentication group it is valid thereby causing the CBE 140 to send an initiation request in the form of a set broadcast message including a first message payload segment. When the set broadcast message is received by the BrMGR an authentication group for which the first message payload segment is intended is determined by the BrMGR in step 207 based on parameters identifying relevant authentication groups received in the set broadcast message. A first encryption key associated with the determined authentication group is determined by requesting the encryption key from the KeyMGR in step 208 and a response is received in step 210.

Alternatively, the determination of authentication groups may be done by the KeyMGR.

To control which end users that can see what information, the information on the cell broadcast channels are encrypted and can only be decrypted by the terminals and applications that know the encryption key. For this reason the first message payload segment is encrypted in step 215 using the received encryption key. A message payload is then aggregated in step 217 by using the encrypted first payload segment and at least a second payload segment.

In step 220 a cell broadcast message is finally transmitted to the CBC 120 of the core network and comprises the aggregated message payload. In step 225 the CBC utilizes a radio network for example the UTRAN for UMTS, or BSS for GSM, to transmit the message payload for receipt by UEs 130.

The same encryption key can could be used by several UE/terminals to achieve multi cast type messaging. Unicast is achieved if the encryption key is unique for one UE/terminal. Messages sent can have different meaning for different users, depending on their status. Different users can receive personalized messages by sending information encrypted with different keys on different channels; different pages; or as different parts of the same page.

With encrypted cell broadcast messages the operator can control which end users who can receive what information. Which encryption keys that will be returned to a terminal can depend on subscription information, account information, or any other subscriber related information.

In step 228 the terminal identifies the different payload segments, which can be encrypted or non-encrypted, including the identification of the first segment.

In step 230 the terminal checks if it the message is a private or public message. If the message is a private message, the terminal checks if it has the authority to decrypt it and decrypts the message in step 235 using previously obtained decryption keys.

The decrypted information is then presented to the user in step 240.

Figure 3:
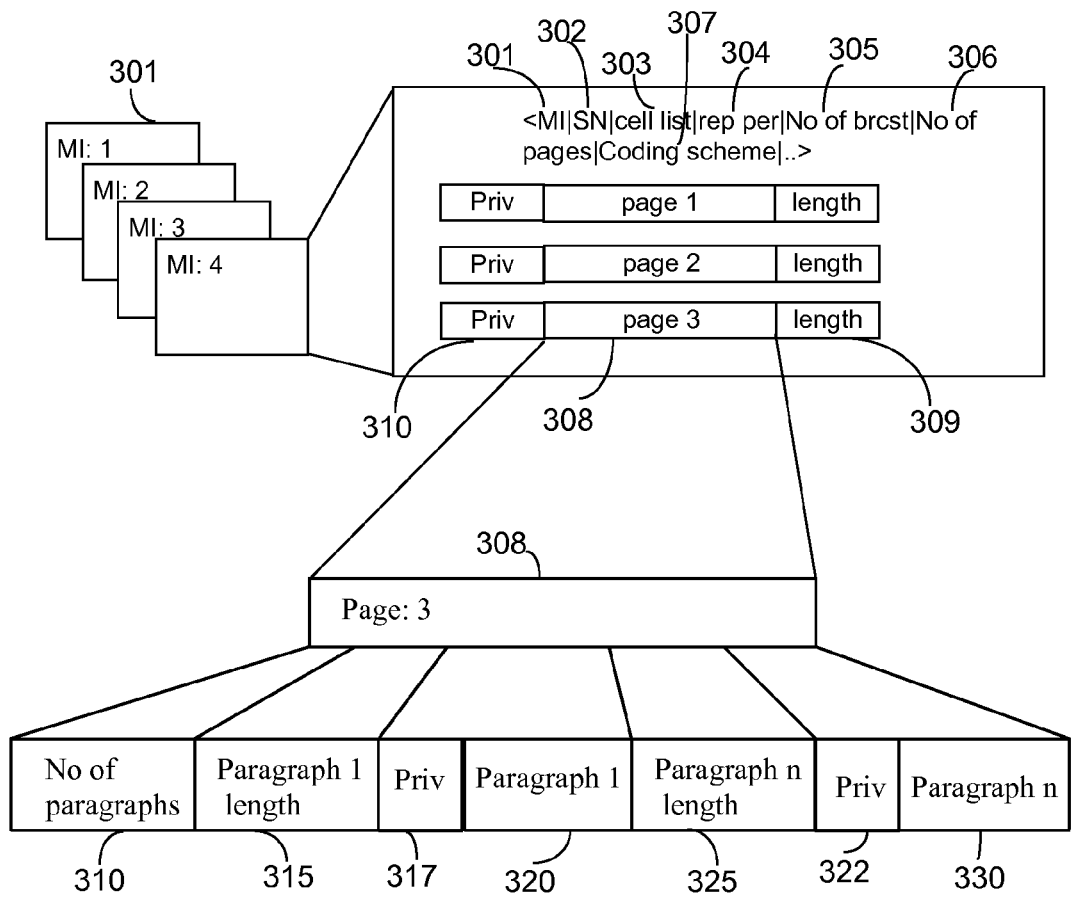
FIG. 3 is a block diagram showing a cell broadcast message structure according to an embodiment of the invention.

FIG. 3 is a block diagram showing a cell broadcast message structure according to an embodiment of the invention.

The GSM and Long Term Evolution LTE standards specify that text can be sent on from the radio base stations to the mobile terminals in the radio network. The information is divided into different logical channels and each logical channel can have several pages of information.

For example, in GSM within a CBC-BSC interface, a CBS message is uniquely identified by the quartet (Message Identifier, Serial Number, Cell Identifier, Channel Indicator). In UMTS within the CBC-RNC interface, a CBS message is uniquely identified by the triplet (Message Identifier, Serial Number, Cell Identifier).

This means that even when two CBS messages have the same semantic contents (for example the same weather forecast) but in different languages or coding schemes, they are considered as different and must therefore be identified by a different quartet. This unique quartet/triplet will be referred to as the "message reference" or logical channel.

The term primitive is used to indicate "an abstract, implementation independent interaction between a service user and a service provider". A primitive comprising the following parameters may be sent by the CBC to the BSC/RNC to broadcast a new CBS message.

Message-Identifier MI 301 identifies source/type of a CBS message and is passed transparently from the CBC to the MS/UE.

New-Serial-Number SN 302 enables CBS message change to be indicated since it is altered every time the CBS message is changed. The serial number identifies a particular CBS message, which may be several pages in length, from the source indicated by the message identifier.

Cell-List 303 identifies a sequence of one or more cells to which the primitives apply.

Category (not shown) indicates the category of the CBS message

Repetition-Period 304 indicates the period of time after which broadcast of the CBS message should be repeated.

No-of-Broadcasts-Requested 305 specifies the number of times the CBS message is to be broadcast.

Number-of-Pages 306 enables the number of pages in the CBS message to be indicated.

Data Coding Scheme 307 identifies the alphabet or coding employed for the message characters and message handling at the MS/UE and is passed transparently from the CBC to the MS/UE.

CBS-Message-Information-Page n 308 is of a fixed length of 82 octets and carries up to and including 82 octets of user information. Where the user information is less than 82 octets, the remaining octets is filled with padding. The content of a CBS-Message-Information-Page is passed transparently from the CBC to the MS/UE. In GSM the CBS-Message-Information-Page n becomes the 'Content of Message' parameter at the MS. In UMTS the CBS-Message-Information-Pages together with the associated CBS-Message-Information-Length parameter is broadcasted as a single unit over the radio interface.

CBS-Message-Information-Length n 309 gives the number of octets of the CBS-Message-Information-Page n containing user information. The remaining octets of the CBS-Message-Information-Page n contain only padding information and are not included in this parameter.

Privacy-Page-Indicator 310 indicates whether the subsequent page is private or public. Each broadcast page is identified as a public or private message to allow a receiving UE 130 to identify and display the public messages and the private messages it has the encryption keys for. The encryption level to use depends on the required level of security and or the processing capacity of the encrypting and decryption nodes. For example, common encryption methods as RSA, DES or RC4 may be employed.

Pages may be further divided down to payload segments in the form of paragraphs by specifying that the message payload of the page consists of paragraphs and before each paragraph specify the length of the paragraph. For example, each payload segment 308 of a page, e.g. a CBS-Message-Information-Page, of a cell broadcast message is divided into a Number of paragraphs parameter 310 specifying the total number of paragraphs in the payload segments of the page. The first payload segment in the form of paragraph 320 is preceded with a paragraph length indication 315. In the same way, a second payload segment in the form of a paragraph n 330 is preceded with a paragraph length indication 325.

Each of these levels can be encrypted to so that only authorized UEs can decrypt the information. The level to do the encryption on depends on the number of groups that needs different authorization. That is, in a system with a large amounts of groups in the form of different authentication groups and where messages to be transmitted are short in relation to the amount of data that can be transmitted within the same CB message, several individual messages can be transmitted.

Each paragraph, e.g. paragraph 1 and n may include a privacy paragraph indicator 317, 322, in the same way as the Privacy-Page-Indicator.

Figure 4:
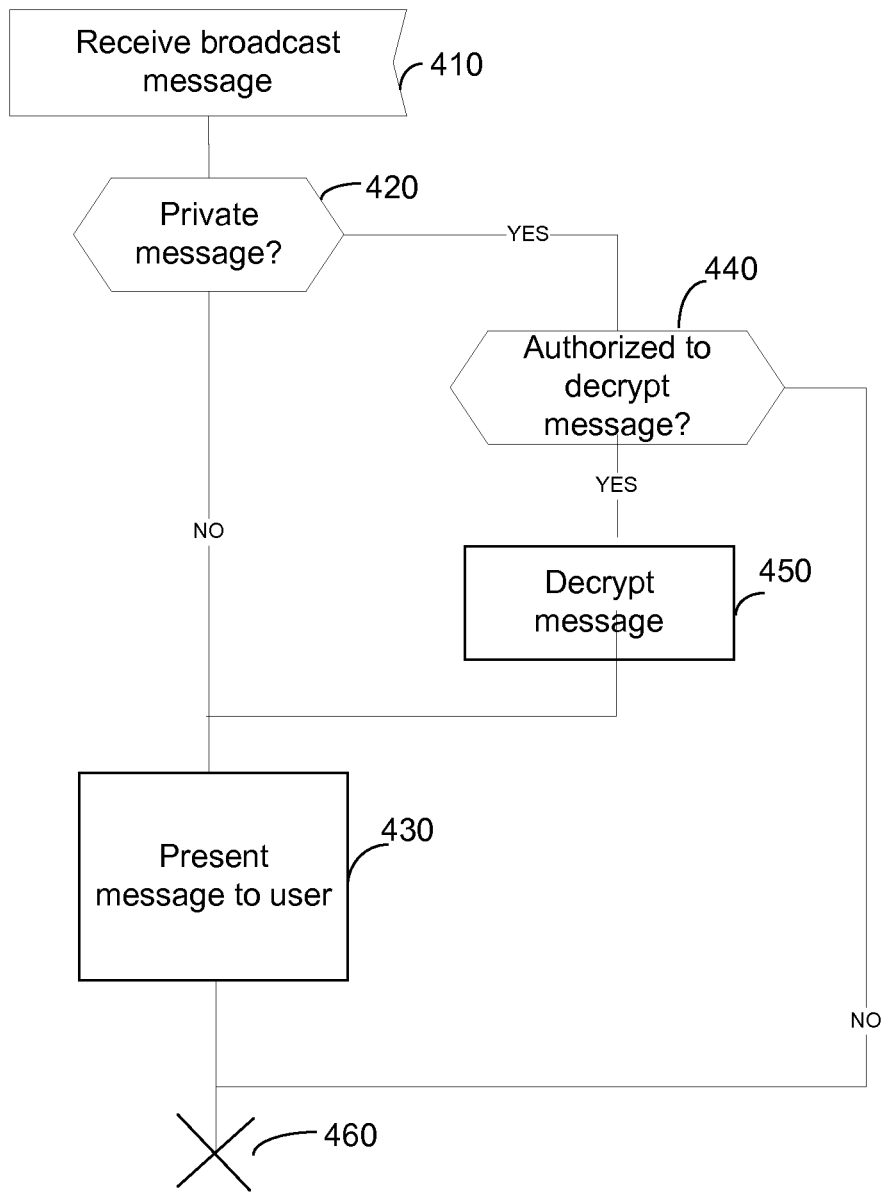
FIG. 4 is a flow chart showing an embodiment of a method for decrypting broadcast messages at a user equipment.

FIG. 4 is a flow chart showing an embodiment of a method for decrypting broadcast messages at a user equipment.

The UE receives a cell broadcast message in step 410. In step 420 the UE determines if the cell broadcast message includes any private segments. If no private segments exist, the message is shown for the user at the UE display in step 430. If the UE determines in step 420 that private segments exists within the message, for example a private page or a private paragraph, the UE proceeds in step 440 with checking whether it is authorized, e.g. has access to decryption keys to decrypt the message. If the UE is not authorized no presentation attempt is made and the method is terminated. If, however, the UE is authorized the message is decrypted in step 450 and the message is presented to the user on the UE display in step 430. The method ends in step 460.

Figure 5:
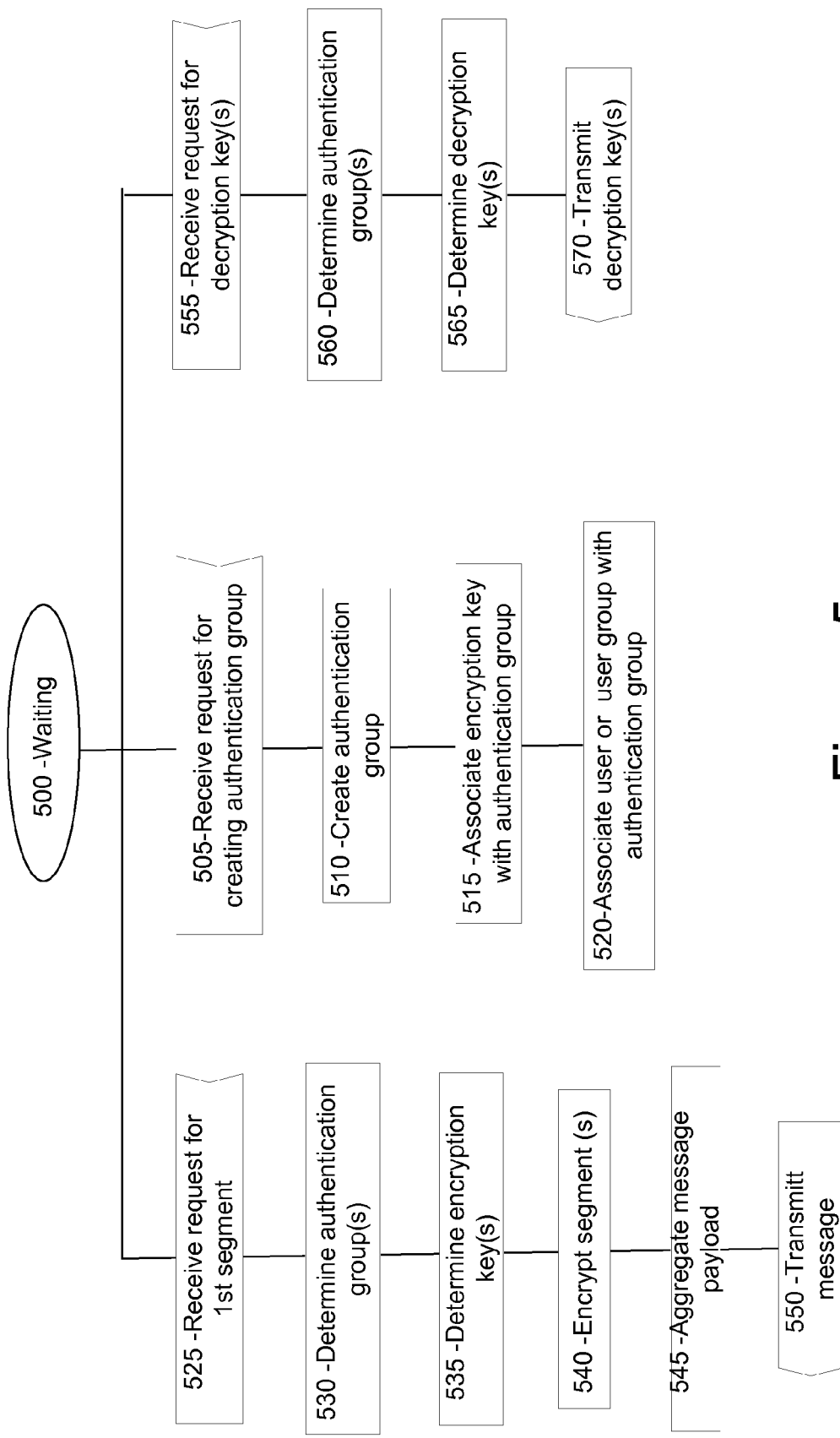
FIG. 5 is a flow chart showing an embodiment of a method for transmitting a cell broadcast message in a mobile communication network.

FIG. 5 is a flow chart showing an embodiment of a method for transmitting a cell broadcast message in a mobile communication network.

In order to send encrypted cell broadcast messages that can be correctly encrypted by a message control node the system is provisioned with authentication group definitions and associated encryption keys. In one alternative solution the message control node is in an waiting state 500 and receives a request for creating an authentication group from a CBE in step 505. In a step 510 the authentication group is created by the message control node, and optionally also an encryption key. The encryption key is associated with the authentication group in step 515. In step 520 users or groups of users may be connected or associated with created authentication groups.

The message control node may then receive an initiation request in step 525 identifying a first message payload segment to be transmitted. An authentication group is for which the first message payload segment is intended is determined in step 530. In step 535 a first encryption key associated with the determined authentication group is determined. Using the first encryption key the first message payload segment is encrypted in step 540. A message payload comprising the encrypted first message payload segment and at least a second message payload segment is aggregated in step 545. In step 550 the cell broadcast message is transmitted comprising the aggregated message payload for message broadcast within at least a part of the communication network. As has been stated earlier, the BrMGR can be located in different nodes. If for example the BrMGR is located in the CBE or located in a stand alone node the cell broadcast message is transmitted to the CBC for further distribution to UEs by the UTRAN or BSS. If the BrMGR is located in the CBC the broadcast message is transmitted to the UTRAN or BSS for further distribution. Optionally, the step 530 of determining an authentication group may comprise the determination being based on a user or user group for which the first message payload segment is intended. The first and/or second message payload segment may be for example a cell broadcast page or a cell broadcast block. The first and/or second message payload segment may also be a subsection of a cell broad cast page wherein the aggregated message payload may further comprise a first indicator allowing an end of the first message payload segment to be identified and/or a second indicator allowing an end of the second message payload segment to be identified.

In order to provision user equipments/mobile terminals to decrypt encrypted/partly encrypted cell broad cast messages the following measures may be employed. The message control node receives a request for decryption keys from a mobile terminal in step 555. The message control node then determines an authentication group allowable for the mobile terminal in step 560. In step 565 a decryption key for the determined authentication group is determined and in step 570 the message control node transmits the determined decryption key for storage at the mobile terminal. The authentication group may for example be determined based on mobile terminal subscriber data such as account data (e.g. amount of used services), subscription data (e.g. being part of social groups, information subscriptions) or user equipment data (brand of terminal, terminal capability).

Figure 6:
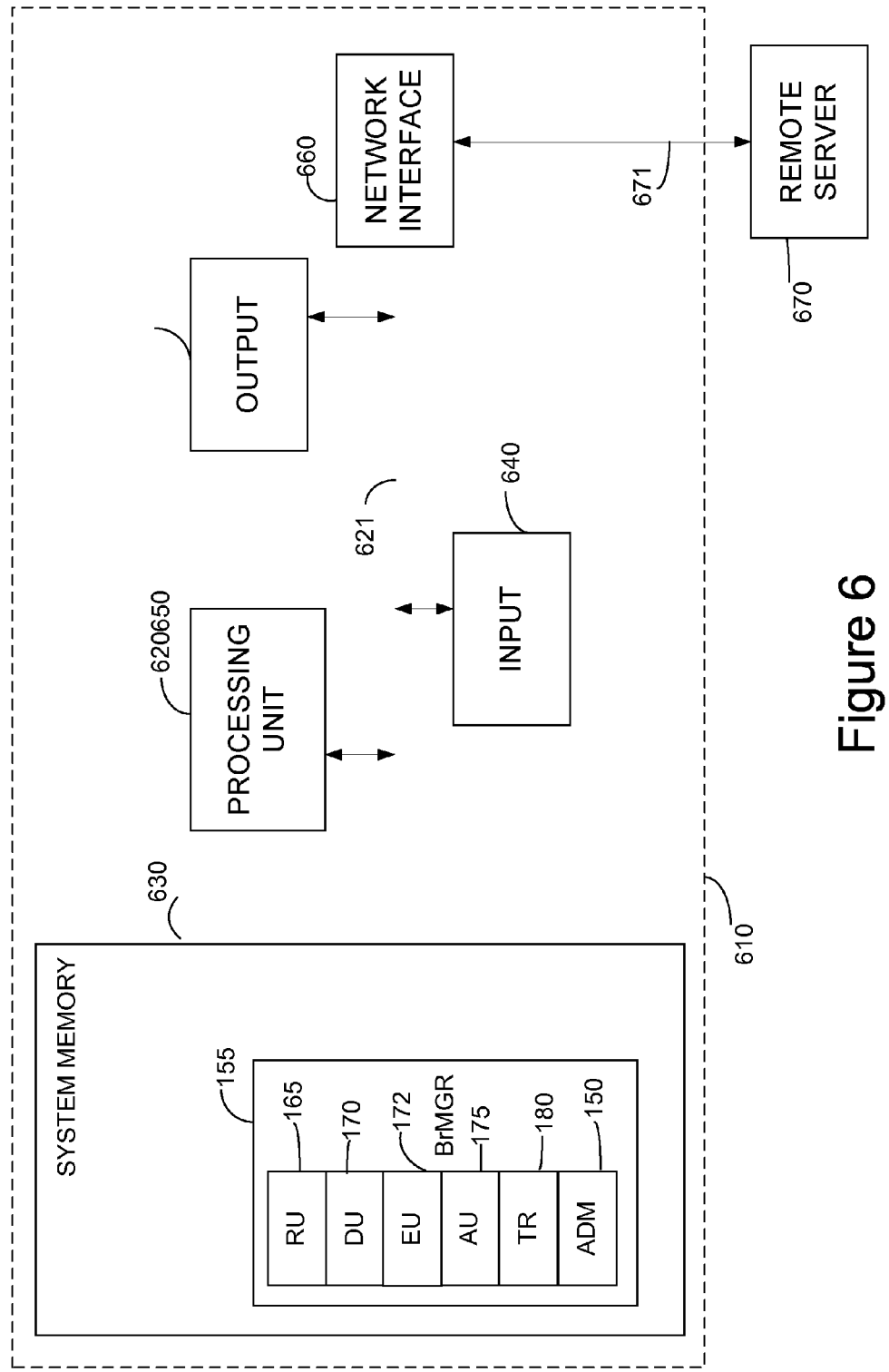
FIG. 6 is a block diagram showing an exemplary computing device for implementing a message control node for transmitting a cell broadcast message in a mobile communication network.

FIG. 6 is a block diagram showing an exemplary computing device for implementing a message control node for transmitting a cell broadcast message in a mobile communication network.

The computing system environment 600 is only one example of a suitable computing environment for a message control node and is not intended to suggest any limitation as to the scope of use or functionality of the claimed subject matter. Further, the computing environment 600 is not intended to suggest any dependency or requirement relating to the claimed subject matter and any one or combination of components illustrated in the example operating environment 600.

An example of a device for implementing the previously described innovation includes a general purpose computing device in the form of a computer 610. Components of computer 610 can include, but are not limited to, a processing unit 620, a system memory 630, and a system bus 621 that couples various system components including the system memory to the processing unit 620. The system bus 621 can be any of several types of bus structures including a memory bus or memory controller, a peripheral bus, and a local bus using any of a variety of bus architectures.

Computer 610 can include a variety of computer readable media. Computer readable media can be any available media that can be accessed by computer 610. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 610. Communication media can embody computer readable instructions, data structures, program modules or other data in a modulated data signal such as a carrier wave or other transport mechanism and can include any suitable information delivery media.

The system memory 630 can include computer storage media in the form of volatile and/or nonvolatile memory such as read only memory (ROM) and/or random access memory (RAM). A basic input/output system (BIOS), containing the basic routines that help to transfer information between elements within computer 610, such as during start-up, can be stored in memory 630. Memory 630 can also contain data and/or program modules that are immediately accessible to and/or presently being operated on by processing unit 620. By way of non-limiting example, memory 630 can also include an operating system, application programs, other program modules, and program data.

In one embodiment the receiver unit 165, determination unit 170, encryption unit 172, aggregation unit 175 and transmission unit 180 are software module loaded in the memory and processable by the processing unit, adapting the message control node in that the receiver unit is adapted for receiving a initiation request identifying a first message payload segment to be transmitted; the determination unit is adapted for determining an authentication group for which the first message payload segment is intended and for determining a first encryption key associated with the determined authentication group; the encryption unit is adapted for encrypting the first message payload segment using the first encryption key; the aggregation unit is adapted for aggregating a message payload comprising the encrypted first message payload segment and at least a second message payload segment and the transmission unit is adapted for transmitting the cell broadcast message comprising the aggregated message payload for message broadcast within at least a part of the communication network.

The computer 610 can also include other removable/non-removable and volatile/nonvolatile computer storage media. For example, computer 610 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 621 through a non-removable memory interface such as an interface, and a magnetic disk drive or optical disk drive can be connected to the system bus 621 by a removable memory interface, such as an interface.

A user can enter commands and information into the computer 610 through input devices such as a keyboard or a pointing device such as a mouse, trackball, touch pad, and/or other pointing device. Other input devices can include a microphone, joystick, game pad, satellite dish, scanner, or similar devices. These and/or other input devices can be connected to the processing unit 620 through user input 640 and associated interface(s) that are coupled to the system bus 621, but can be connected by other interface and bus structures, such as a parallel port, game port or a universal serial bus (USB).

A graphics subsystem can also be connected to the system bus 621. In addition, a monitor or other type of display device can be connected to the system bus 621 through an interface, such as output interface 650, which can in turn communicate with video memory. In addition to a monitor, computers can also include other peripheral output devices, such as speakers and/or printing devices, which can also be connected through output interface 650.

The computer 610 can operate in a networked or distributed environment using logical connections to one or more other remote computers, such as remote server 670, which can in turn have media capabilities different from device 610. The remote server 670 can be a personal computer, a server, a router, a network PC, a peer device or other common network node, and/or any other remote media consumption or transmission device, and can include any or all of the elements described above relative to the computer 610. The logical connections depicted in FIG. 6 include a network 671, such as a local area network (LAN) or a wide area network (WAN), but can also include other networks/buses.

When used in a LAN networking environment, the computer 610 is connected to the LAN 671 through a network interface or adapter. When used in a WAN networking environment, the computer 610 can include a communications component, such as a modem, or other means for establishing communications over a WAN, such as the Internet. A communications component, such as a modem, which can be internal or external, can be connected to the system bus 621 through the user input interface at input 640 and/or other appropriate mechanism.

In a networked environment, program modules depicted relative to the computer 610, or portions thereof, can be stored in a remote memory storage device. It should be noted that the network connections shown and described are exemplary and other means of establishing a communications link between the computers can be used.

Figure 7:
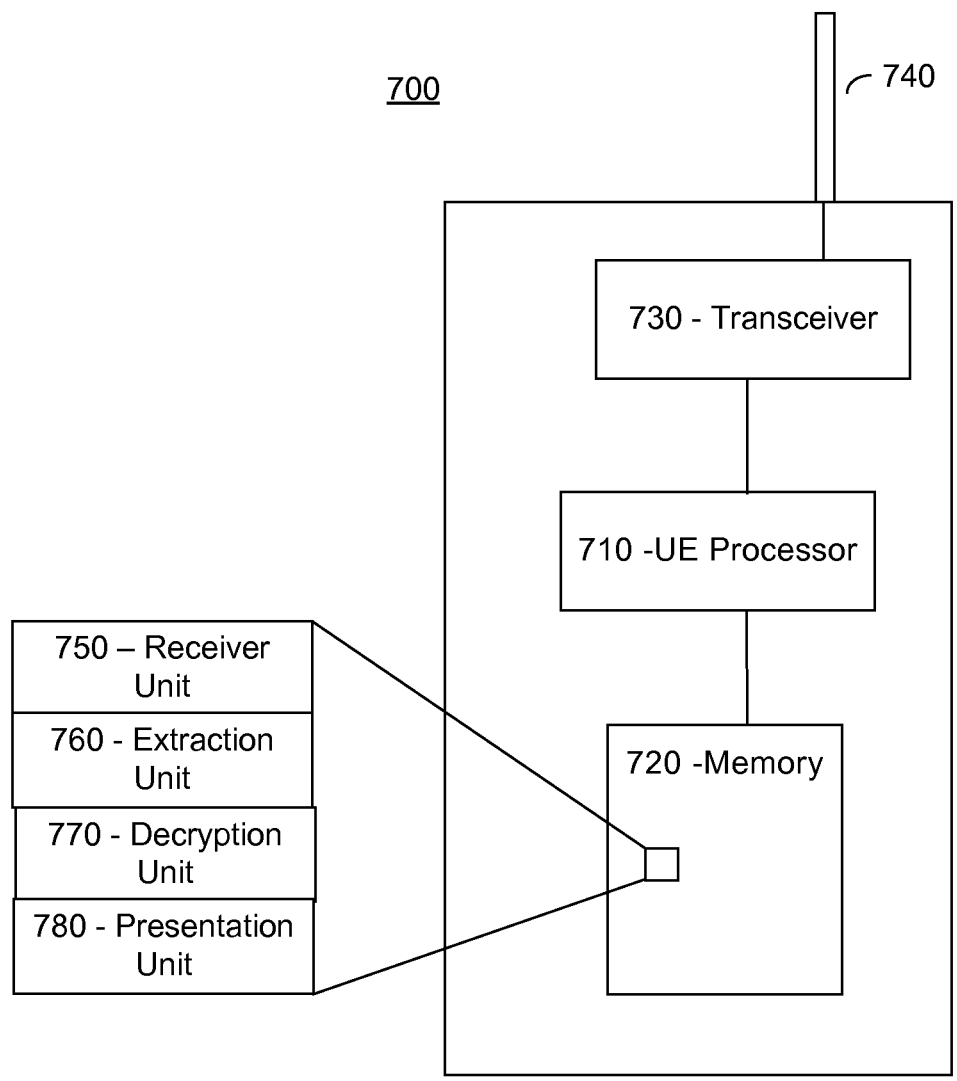
FIG. 7 is a block diagram showing an exemplary embodiment of a user equipment adapted for decrypting a cell broadcast message.

FIG. 7 is a block diagram showing an exemplary embodiment of a user equipment adapted for decrypting a cell broadcast message.

Although the illustrated UEs or mobile terminals may represent communication devices that include any suitable combination of hardware and/or software, these UEs may, in particular embodiments, represent devices such as the example UE illustrated in greater detail by FIG. 7.

As shown in FIG. 7, the example UE includes a processor 710, a memory 720, a transceiver 730, and an antenna 740. In particular embodiments, some or all of the functionality described above as being provided by mobile communication devices or other forms of UE may be provided by the UE processor executing instructions stored on a computer-readable medium, such as the memory 720. Alternative embodiments of the UE may include additional components beyond those shown in FIG. 11 that may be responsible for providing certain aspects of the UE's functionality, including any of the functionality described above and/or any functionality necessary to support the solution described above.

In one embodiment the mobile terminal is adapted for decrypting a cell broadcast message in that a receiver unit 750, extraction unit 760, decryption unit 770, and presentation unit 780 are provided as software modules loaded in the memory and processable by the processing unit thereby adapting the mobile terminal such that:
the receiver unit is arranged for receiving an decryption key and for receiving a cell broadcast message comprising an aggregated message payload comprising an encrypted first message payload segment and at least a second message payload segment;
the extraction unit is arranged for identifying the encrypted first message payload segment;
the decryption unit is arranged for decrypting the first message payload segment using the received decryption key; and
the presentation unit is arranged for presenting the decrypted first message payload segment at the mobile terminal.

The extraction unit may be adapted to extract the first and/or second message payload segment from a cell broadcast page or a cell broadcast block of the cell broadcast message.

The extraction unit may also be adapted to extract the first and/or second message payload segment from a subsection of a cell broadcast page of the cell broadcast message.

Additionally, it should be noted that as used in this application, terms such as "component," "display," "interface," and other similar terms are intended to refer to a computing device, either hardware, a combination of hardware and software, software, or software in execution as applied to a computing device. For example, a component may be, but is not limited to being, a process running on a processor, a processor, an object, an executable, a thread of execution, a program and a computing device. As an example, both an application running on a computing device and the computing device can be components. One or more components can reside within a process and/or thread of execution and a component can be localized on one computing device and/or distributed between two or more computing devices, and/or communicatively connected modules. Further, it should be noted that as used in this application, terms such as "system user," "user," and similar terms are intended to refer to the person operating the computing device referenced above.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various exemplary combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

For example, advantages obtained by various embodiments of the invention are that it will be possible for the operator to control which end users that can view cell broadcast messages or parts thereof; the signaling in the operator networks will be reduced compared to if the terminals needs to pull for individual messages; the operator will get a better marketing channel since the operator can control to whom the marketing information is sent and users outside the marketing segment will not be able to interpret the marketing messages. Also, messages can be personalized and feel more exclusive for the end user. As a further example, cell broadcast may used to communicate the discount for specific users in specific cells. If only eligible discount users can decrypt the cell broadcast message or parts thereof the problem of non-eligible getting access to discount information is avoided.

The invention claimed is:

1. A method in a message control node for transmitting a cell broadcast message in a mobile communication network, the method comprising:
   receiving an initiation request identifying a first message payload segment to be transmitted;
   determining an authentication group of mobile terminals for which the first message payload segment is intended;
   determining a first encryption key associated with the determined authentication group of mobile terminals;
   encrypting the first message payload segment using the first encryption key;
   aggregating a message payload comprising the encrypted first message payload segment and at least a second encrypted message payload segment, each message payload segment encrypted so that the determined authentication group of mobile terminals can decrypt the encrypted first message payload segment and a separate authentication group of mobile terminals can decrypt the second encrypted message payload segment, wherein the aggregated message payload comprises a first indicator allowing an end of the encrypted first message payload segment to be identified and/or a second indicator allowing an end of the second encrypted message payload segment to be identified by a receiving mobile terminal; and
   transmitting the cell broadcast message comprising the aggregated message payload for message broadcast within at least a part of the communication network, wherein the cell broadcast message includes multiple pages and each page further includes multiple paragraphs with parameters that specify length of each paragraph and wherein the encrypted first message payload segment and/or the second encrypted message payload segment is a paragraph of a page of the cell broadcast message.

2. The method according to claim 1 wherein the determining the authentication group is based on a user or user group for which the first message payload segment is intended.

3. The method according to claim 1 further comprising:
   receiving a request for decryption keys from a mobile terminal;
   determining an authentication group allowable for the mobile terminal;
   determining a decryption key for the determined authentication group;
   transmitting the determined decryption key for storage at the mobile terminal.

4. A method according to claim 3 wherein the authentication group is determined based on mobile terminal subscriber data.

5. The method according to claim 1 wherein the cell broadcast message includes at most 15 different payload segments.

6. The method according to claim 1 wherein the cell broadcast message includes a message class that categorizes type of information included in the cell broadcast message.

7. A message control node for transmitting a cell broadcast message in a mobile communication network, the message control node comprising:
   a memory;
   a network interface; and
   a processor operatively coupled to the memory and the network interface, wherein the processor is configured to:
      receive an initiation request from the memory identifying a first message payload segment to be transmitted;
      determine an authentication group of mobile terminals for which the first message payload segment is intended and for determining a first encryption key associated with the determined authentication group of mobile terminals;
      encrypt the first message payload segment using the first encryption key;
      aggregate a message payload comprising the encrypted first message payload segment and at least a second encrypted message payload segment, each message payload segment encrypted so that the determined authentication group of mobile terminals can decrypt the encrypted first message payload segment and a second authentication group of mobile terminals can decrypt the second encrypted message payload segment, wherein the processor is configured to include in the aggregated message payload, a first indicator allowing an end of the encrypted first message payload segment to be identified and/or a second indicator allowing an end of the second encrypted message payload segment to be identified by a receiving mobile terminal; and
      instruct the network interface to transmit the cell broadcast message comprising the aggregated message payload for message broadcast within at least a part of the communication network, wherein the cell broadcast message includes multiple pages and each page further includes multiple paragraphs with parameters that specify length of each paragraph and wherein the encrypted first message payload segment and/or the second encrypted message payload segment is a paragraph of a page of the cell broadcast message.

8. The message control node according to claim 7 wherein the processor is configured to determine the authentication group based on a user or user group for which the first message payload segment is intended.

9. A message control node according to claim 7 wherein the processor is configured to:
   determine the second authentication group for which a second message payload segment is intended;
   determine a second encryption key associated with the second authentication group; and
   encrypt the second message payload segment using the second encryption key;
   and wherein the aggregating is aggregating the encrypted second message payload segment.

10. A message control node according to claim 7 wherein the processor is configured to adapt the cell broadcast message to comprise an indication on whether the first and/or second payload segment is encrypted or unencrypted.

11. The message control node according to claim 7 wherein the cell broadcast message includes at most 15 different payload segments.

12. The message control node according to claim 7 wherein the cell broadcast message includes a message class that categorizes type of information included in the cell broadcast message.

* * * * *